United States Patent
Gygi et al.

(10) Patent No.: US 7,385,927 B2
(45) Date of Patent: Jun. 10, 2008

(54) METHODS AND STRUCTURE FOR IMPROVED TESTING OF EMBEDDED SYSTEMS

(75) Inventors: Carl Edward Gygi, Colorado Springs, CO (US); Andrew J. Hadley, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 1082 days.

(21) Appl. No.: 10/178,323

(22) Filed: Jun. 24, 2002

(65) Prior Publication Data

US 2003/0235156 A1    Dec. 25, 2003

(51) Int. Cl.
*G06F 11/00*        (2006.01)
(52) U.S. Cl. .................................. 370/242; 714/742
(58) Field of Classification Search ............... 370/241; 714/724
See application file for complete search history.

(56) References Cited

U.S. PATENT DOCUMENTS

| | | | | |
|---|---|---|---|---|
| 5,107,500 A * | 4/1992 | Wakamoto et al. | ............ | 714/26 |
| 5,233,611 A * | 8/1993 | Triantafyllos et al. | ........ | 714/46 |
| 5,274,797 A * | 12/1993 | Barlow et al. | ................ | 714/46 |
| 5,349,660 A * | 9/1994 | Sutula et al. | ................ | 702/123 |
| 5,615,136 A * | 3/1997 | Baraton et al. | ................ | 703/21 |
| 5,615,225 A * | 3/1997 | Foster et al. | ............. | 379/29.01 |
| 5,726,920 A * | 3/1998 | Chen et al. | .................. | 702/108 |
| 5,732,247 A * | 3/1998 | Dearth et al. | ................. | 703/13 |
| 5,864,658 A * | 1/1999 | Theobald | .................... | 714/25 |
| 5,943,391 A * | 8/1999 | Nordling | .................... | 379/1.03 |
| 6,034,907 A * | 3/2000 | Haraguchi | .................. | 365/201 |
| 6,321,366 B1 * | 11/2001 | Tseng et al. | ................... | 716/6 |
| 6,427,224 B1 * | 7/2002 | Devins et al. | ................. | 716/4 |
| 6,883,128 B2 * | 4/2005 | Kang et al. | .................. | 714/738 |
| 2002/0073374 A1 * | 6/2002 | Danialy et al. | ............. | 714/738 |

(Continued)

FOREIGN PATENT DOCUMENTS

WO       WO98/26617        *   6/1998

OTHER PUBLICATIONS

Maston (Structuring STIL for incremental test development, Test Conference 1997 Proceedings, Nov. 1-6, 1997, pp. 1004-1010).*

(Continued)

*Primary Examiner*—Edan Orgad
*Assistant Examiner*—Salman Ahmed
(74) *Attorney, Agent, or Firm*—Duft, Bornsen & Fishman LLC

(57) ABSTRACT

Methods and structure for standardized communication between a test operator, a host system, and an embedded system under test. Test program instructions are designed, written for, and executed on, an embedded system under test in accordance with standard API functions for message exchange. Still further, the invention provides for standards in the user interface to select a desired test, to start the test with defined parameters and to present reply and status information to the test operator. These user interactions are defined in a test configuration language of the present invention and preferably incorporated with the executable image file to define an integral test vehicle file. The present invention thereby reduces test sequence development time by providing standard API functions for message exchange between a host system test application and the system under test and provides for standardized user interaction in a flexible, easily maintained design language.

8 Claims, 3 Drawing Sheets

U.S. PATENT DOCUMENTS

| | | | |
|---|---|---|---|
| 2003/0131283 A1* | 7/2003 | Ur et al. | 714/36 |
| 2003/0226076 A1* | 12/2003 | Kang et al. | 714/724 |
| 2005/0262410 A1* | 11/2005 | Parvathala et al. | 714/738 |
| 2007/0168808 A1* | 7/2007 | Ong | 714/731 |
| 2007/0245199 A1* | 10/2007 | Pochowski | 714/742 |

OTHER PUBLICATIONS

Davis, W.B.; Chanson, S.; Vuong, S.; Ito, M.; Neufeld, G.; Architecture and design of a portable protocol tester; ☐☐Network, IEEE vol. 5, Issue 3, May 1991 pp. 24-31 ☐☐.*

Frohnhoff, B.; Schulz-Sternkopf, P.; An advanced TMN test system-TSE-P; Network Operations and Management Symposium, 1996., IEEE vol. 2, Apr. 15-19, 1996 pp. 444-453 vol. 2 ☐☐.*

Ziegler, J. Grasso, J.M. Burgermeister, L.G. An Ada based real-time closed-loop integration and regression; This paper appears in: Software Maintenance, 1989., Proceedings., Conference on Publication Date: Oct. 16-19, 1989 On pp. 81-90 Meeting Date: Oct. 16, 1989-Oct. 19, 1989 Location: Miami, FL, USA.*

Ziegler, J. Universal Ada Test Language (UATL) to support real-timesoftware/system integration and factory/maintenance fault isolation[military avionics]; This paper appears in: Autotestcon '88. IEEE International Automatic Testing onference, Futuretest. Symposium Proceedings Publication Date: Oct. 4-6, 1988 On pp. 85-92 Meeting Date: Oct. 2004.*

* cited by examiner

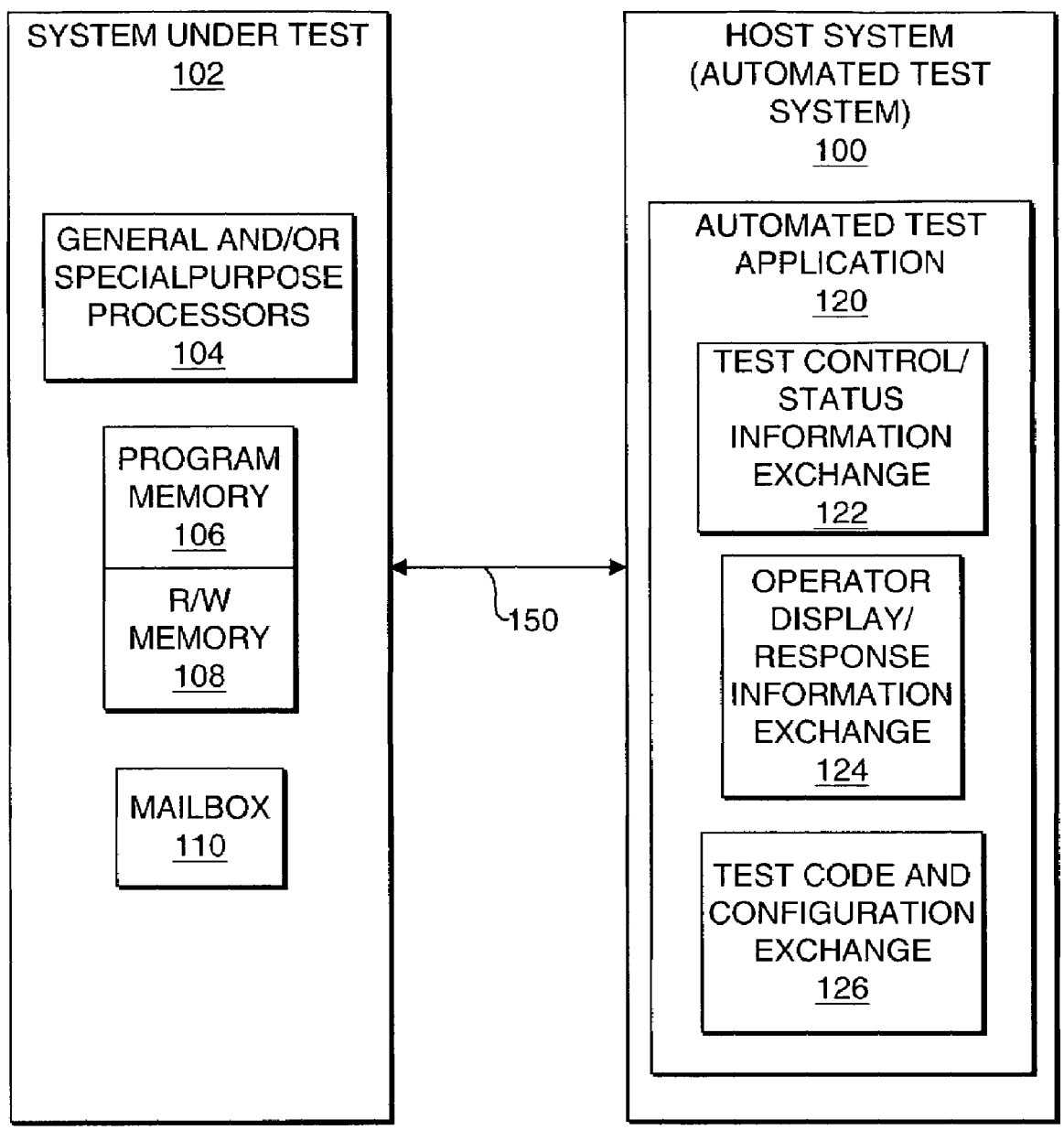
FIG._1

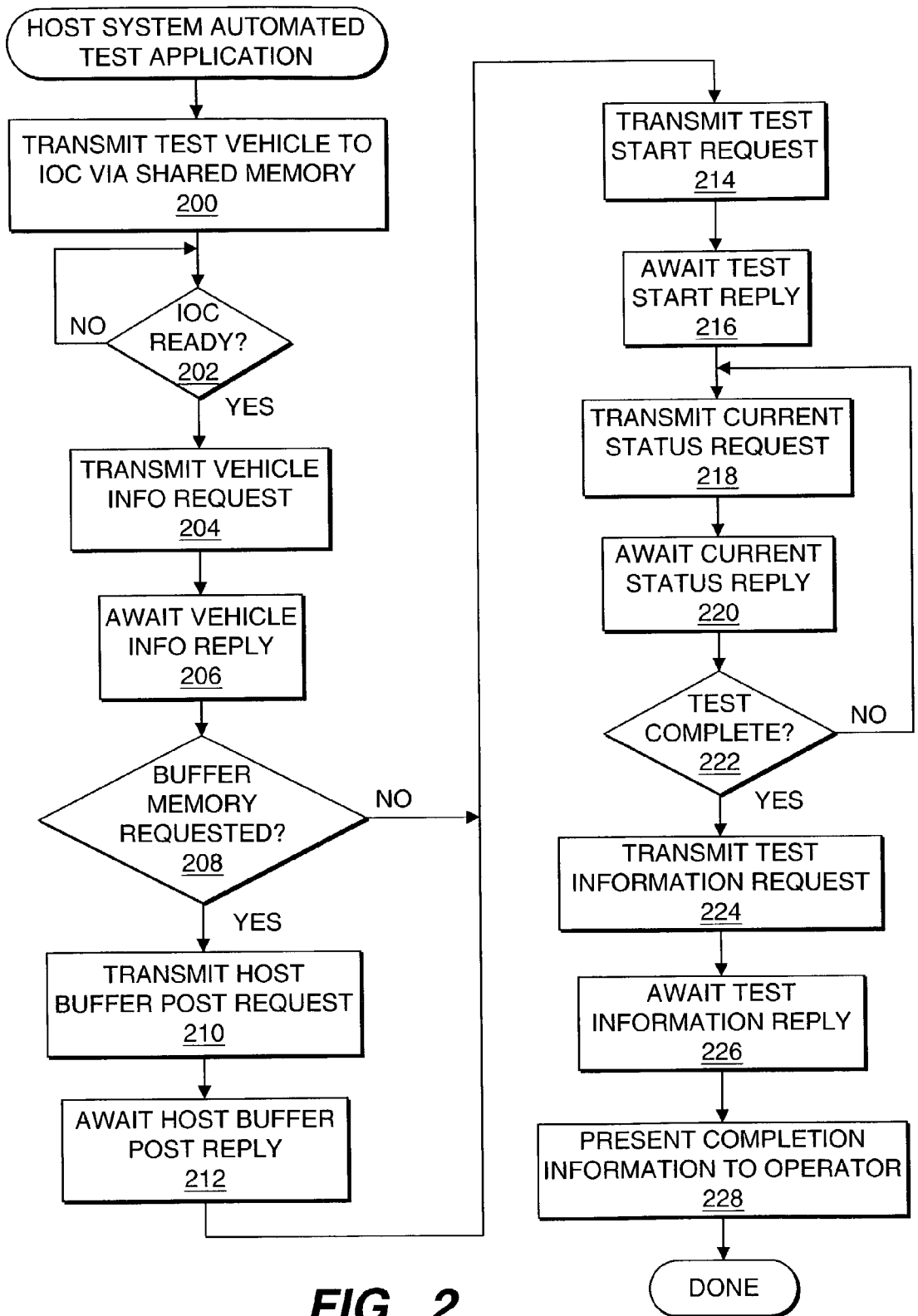
FIG._2

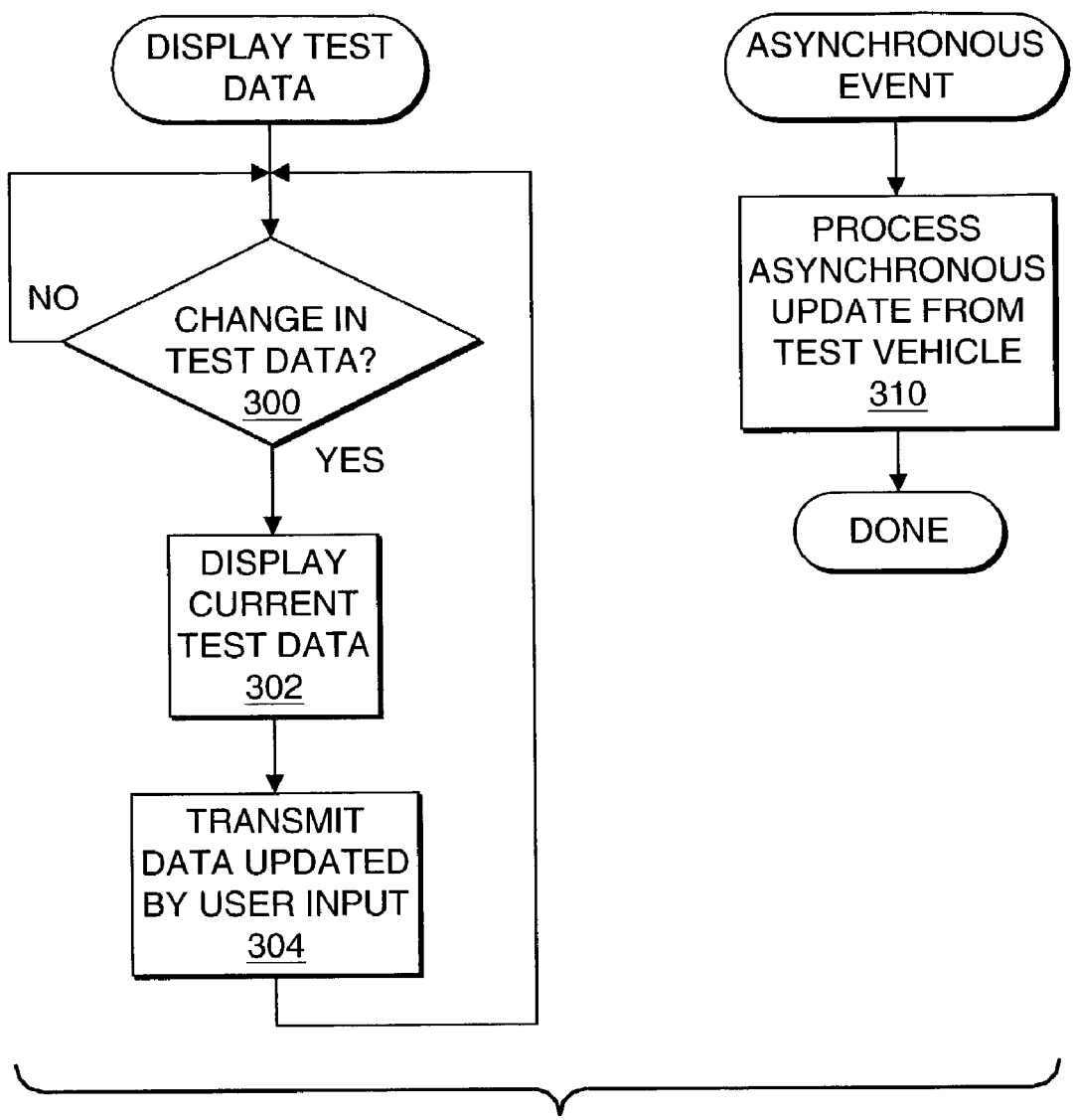
FIG._3

METHODS AND STRUCTURE FOR IMPROVED TESTING OF EMBEDDED SYSTEMS

BACKGROUND OF THE INVENTION

1. Field of the Invention

The invention relates generally to computer assisted, automated testing systems and procedures and more specifically relates to improved methods and structures for automated testing of embedded systems by providing a standardized user interface and API for communications between the embedded system under test, the test operator and an associated automated test host system.

2. Discussion of Related Art

It is critical in the electronic arts, and other technological arts, to verify design and operation of products and systems prior to volume manufacturing and distribution of such products. Further, as products evolve with enhancements and modifications, it is similarly critical to verify design and operation of the products so modified. In one form of testing, the system or product under test is viewed as a "black box" such that external information or stimuli are provided as inputs to the black box (system under test) and resulting actions or output values are confirmed as proper actions or outputs of the black box in response to appropriately applied stimuli. The internal structure and operation inside the "black box" are not relevant to such testing.

Such "black box" of testing is adequate to verify operation of the system in response to numerous expected environmental circumstances and stimuli. However, such black box testing often is insufficient to apply stressful stimuli outside normal expected ranges of operation.

In view of the weaknesses and limitations of black box testing, other forms of testing (sometimes referred to as "white box" testing) are useful to more effectively verify operation of the system under test in response to a wider range of stimuli including those associated with conditions generated internal to the system under test. Exemplary of such testing approaches is the automated testing of embedded systems. For example, it is common that intelligent I/O controller devices inserted within a host system often possess substantial computational and processing power as integrated circuit chips designed within the intelligent I/O controller. For example, an intelligent I/O controller may include one or more general-purpose processing devices (i.e., CPUs), one or more special-purpose processors (i.e., I/O coprocessors), and substantial amounts of memory for storing code to operate the various processors, variables associated with that operation and buffer memory for buffering user data moving into, or out of, the intelligent I/O controller. To effectively test operation of all of these components often requires that special test programs be designed and loaded into the program memory associated with the intelligent I/O controller so as to enable the various processors within such an intelligent I/O controller to perform tests applying internally generated stimuli.

As presently practiced in the art, no standards exist for development, and operation of such embedded test sequences. Rather, individual test engineers often design unique test cases by producing appropriate test code instructions and developing unique host interfaces for communicating parameters of the test and test results between the host system in use by the test operator and the embedded systems under test. Creation of such a unique interface between systems under test and host systems with which a test operator interacts can create confusion in the style of interaction and hence errors in test procedures. Further, such unique design efforts generate duplicative work by multiple engineers each creating unique embedded test interfaces rather than sharing a common, standard interface.

It is evident from the above discussion that a need exists for improved methods and structures for generating, configuring and operating test sequences especially on embedded systems under test.

SUMMARY OF THE INVENTION

The present invention solves the above and other problems, thereby advancing the state of the useful arts, by providing methods and associated structure for a common, standardized user interface and programming interface for communications between a test operator, a host system on which the test operator interacts to perform desired tests, and the systems under test. In particular, the present invention includes an application programming interface (API) defining a communications protocol between a system under test and an attached host system on which a test operator using a test application interacts with the system under test. Further, the invention provides for coupling configuration related information associated with the test with the stored program instructions required to perform the particular test. Still further, the present invention allows for integration of user interface information with the stored program instructions used to perform the specific test. These and other features of the present invention reduce the time required for a test engineer to develop a new test by providing standardized interfaces for exchange of information between the test host system and an embedded system under test. The present invention further reduces time required by an engineer to develop a new test by eliminating the need for customized, unique test operator interface code to be developed. Rather, the present invention provides standardized test operator interfaces associated with the test case. Lastly, the present invention also provides for integrating the program instructions associated with performing the test within an embedded system under test with the configuration information and user interface information associated with selecting and performing a desired test sequence. These features also improve the uniformity of test operator interfaces to permit more consistent, less error prone, interactions with human test operators.

BRIEF DESCRIPTION OF THE DRAWINGS

FIG. 1 is a block diagram of a host system coupled to a system under test in accordance with the present invention to provide standardized exchange of information there between.

FIG. 2 is a flowchart describing a method of the present invention operable to initiate test procedures and exchange control and status information between a host system test application and a test vehicle operating on the system under test.

FIG. 3 is a flowchart describing operation of additional features of the present invention to display test information on a host system supplied by a system under test and to sense receipt of asynchronous events sent from the system under test to the host system test application.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of a system in accordance with the present invention whereby a host system (automated test system) 100 is in communication with a system under test 102 via path 150 for purposes of performing automated test procedures. Host system 100 may be any standard computing system including, for example, personal computers and workstations. System under test 102 may similarly be any computing system including standard personal computers and workstations. In a preferred embodiment, system under test 102 is an intelligent I/O controller ("IOC") in communications with host system 100 via path 150. In general, path 150 may represent any suitable computer communications medium and protocol. In a preferred embodiment in which system under test 102 is an intelligent I/O controller (IOC), communication path 150 may be, for example, a PCI bus interface for insertion of IOC 102 into host system 100. Further discussions herein below presume, for simplicity of this discussion, that system under test 102 is such an exemplary IOC embodiment coupled to host system 100, a standard personal computer or workstation, by PCI bus 150. Those skilled in the art will readily recognize that the structures and methods of the present invention are similarly applicable to many forms of systems under test in communications with an automated test system 100.

IOC 102 may include one or more general-purpose and or special-purpose processors 104 providing computational and data processing capabilities within IOC 102. Exemplary of such a general-purpose processor is any standard CPU. Exemplary of such special-purpose processors are I/O coprocessors for providing control of associated I/O peripheral devices and buses (not shown). Processors 104 execute program instructions preferably stored in program memory 106. Program memory 106 may be any form of memory suitable for storage and fetching of program instructions including, for example, ROM, PROM, EPROM, EEPROM, Flash memory, RAM (including standard DRAM or SRAM), etc. In a preferred embodiment, program memory 106 may be accessible as shared memory for direct access by host system 100 via a PCI bus 150 to permit host system 100 to directly load programmed instructions into IOC 102.

In addition, IOC 102 may include read/write memory 108 for storage of data and variables manipulated by operation of processors 104. Read/write memory 108 may be any form of memory suitable for storage and manipulation of data and variables including, for example, Flash memory, RAM (including standard DRAM and SRAM), etc. Similar to program memory 106, read/write memory 108 may preferably be accessible as shared memory to a host system 100 via a PCI bus 150.

In accordance with the present invention, IOC 102 preferably includes mailbox 110 (also referred to herein as "doorbell") for purposes of exchange of information with host system 100. As noted above, program memory 106 and/or read/write memory 108 may also be adapted as shared memory accessible to host system 100. Mailbox 110 may therefore merely represent a designated portion of a larger shared memory component within IOC 102. Further, those of ordinary skill in the art will readily recognize that mailbox 110 may be implemented as one or more read/write registers in accordance with PCI or other bus interface standards. Numerous equivalent implementations will be readily recognized by those of ordinary skill in the art.

Automated test application 120 is preferably operable on host system 104 to coordinate operation of test procedures on IOC 102. Automated test application 120 may preferably communicate with IOC 102 using mailbox 110. Messages are sent from the host system 100 to the system under test 102 by the automated test application 120 to initiate actions and to request status information. Replies to such requests are forwarded by IOC 102 to host system 100 through mailbox 110 for processing by automated test application 120.

Automated test application 120 may preferably include a test control and status information exchange element 122 for controlling operation of test procedures within IOC 102 and for receiving status information regarding progress and completion of such test procedures from IOC 102. Automated test application 120 also may preferably include operator display and response information exchange element 124 for presenting information to a test operator. The information to be presented may preferably be generated by test procedures operable within IOC 102. Automated test application 120 may also preferably include test code and configuration information exchange element 126 for downloading program instructions and associated configuration information and parameters for performing desired tests sequences. Program instructions that define a test procedure and associated configuration information are also referred to herein as a "vehicle." The vehicle includes all information needed by IOC 102 to perform the desired test sequence including programmed instructions and associated configuration information. Elements 122, 124 and 126 of automated test application 120 preferably communicate with IOC 102 via mailbox 110 and/or other shared memory structures or other communication media.

In a preferred embodiment, the exchange of information between automated test application 120 on host system 100 and IOC 102 uses a standardized request/reply message exchange format. In a preferred embodiment, the host system 100, through test application 120, initiates a message exchange by generating and transmitting an appropriate request message. The IOC 102 receives the request message through the mailbox 110 and processes the request appropriately. Upon completion of the request, a reply message corresponding to the request is generated and returned to the host system 100 through mailbox 110. Such a request/reply messaging format helps simplify the message exchange structure by its synchronous exchange process to thereby avoid problems of deadlock over a shared resource shared by asynchronously operating processes.

An exemplary message exchange protocol useful for such communications is provided further herein below. The functions identified below define an API used for coding of test cases by test engineers. Specific parameter fields and syntax of the function calls are a matter of design choice well known to those of ordinary skill in the art and therefore need not be provided herein. This standard API is independent of the particular system under test on which the test vehicle is to operate. Thus, a test designer may design all tests using a common API for communications with the host system test application. Those of ordinary skill in the art will recognize a variety of equivalent structures and messaging media and protocols to provide for simple, reliable, standardized communications between a host system and a system under test. By adhering to a simple, reliable, standardized messaging protocol, a test engineer need only write program instructions for performing a desired test sequence using the standard message exchange protocol when needed during the test operation and need not design a unique messaging standard for host system interaction by the system under test.

Validation Messaging Interface (VMI)—API

VMI Communication: VMI uses a simple Request/Reply method of communicating. With minor exceptions as noted, every Request message sent from the host system will have an associated Reply message returned by the IOC. Both Request and Reply messages are transmitted through the mailbox (doorbell) interface.

Simple Doorbell Message: In a preferred embodiment, all messages (Requests and Replies) are integral multiples of 32-bit words in length. However, those of ordinary skill in the art will recognize that any standard, fixed word size or non-fixed size (i.e., multi-bit frame) encoding can be used for purposes of encoding messages to be transmitted through the mailbox. Further, those of ordinary skill in the art will readily recognize a variety of options for encoding of fields within a message. Such selections of fixed words, non-fixed size bit frames and encodings of fields within such messages are well-known matters of design choice for those of ordinary skill in the art. Preferably, more common or frequently used messages are encoded as shorter words or frames. Through described below with respect to fixed 32-bit size words and with specific bit positions for encoding of fields, any word or frame sizes and any particular encoding of fields within a message may be used.

List of Exemplary Simple-Word Doorbell Messages

RESET_IOC_REQUEST

This will be tied onto an interrupt and force a reset of the IOC if sent. No Reply message is generated from this Request.

STOP_TEST_REQUEST

STOP_TEST_REPLY

This will attempt to stop the running of the IOC test vehicle. The Reply message indicates that the test vehicle has stopped.

CURRENT_TEST_STATUS_REQUEST

CURRENT_TEST_STATUS_REPLY

This requests the present status of the test vehicle. The reply message includes a status value that may be dependant on the test that is currently running. A parameter supplied with the request message indicates which of a plurality of standard status values is to be returned. A first status value to be returned is standardized and provides general status of the overall test vehicle. Other standard status values may be requested as indicated by the parameter associated with the request message. These other standard values may be used to return other standard information about the test, such as: bytes transferred, errors received, locations tested and other useful information the vehicle may want to relay to the test application and test operator. The following table lists exemplary standard general status values as bit fields in a 32-bit value.

| CURRENT_TEST_STATUS exemplary status bits. | |
|---|---|
| Bit | Definition |
| Bit 0 | VMI_CURRENT_STATUS_TEST_COMPLETE |
| Bit 1 | VMI_CURRENT_STATUS_TEST_RUNNING |
| Bit 2 | VMI_CURRENT_STATUS_TEST_FAIL |
| Bit 3 | VMI_CURRENT_STATUS_INIT |
| Bit 4 | VMI_CURRENT_STATUS_GOT_RESET |
| Bit 5 | VMI_CURRENT_STATUS_NEED_RESOURCES |
| Bit 6 | VMI_CURRENT_STATUS_DOORBELL_IN_USE |
| Bit 7 | VMI_CURRENT_STATUS_REQUEST_ISSUED |
| Bit 8 | VMI_CURRENT_STATUS_REPLY_READY |
| Bit 9 | VMI_CURRENT_STATUS_DOORBELL_FAIL |
| Bit 10 | VMI_CURRENT_STATUS_STOP_TEST |
| Bit 10-31 | Reserved |

Upon receiving the test complete status, the host system (test application) may send a TEST_SENDREPLY_REQUEST to the vehicle (as discussed below) to request more detailed status specific to the particular test vehicle.

VEHICLE_INFO_REQUEST

VEHICLE_INFO_REPLY

This message requests information about the test vehicle. Additional fields in the request message also provide the test vehicle with information about the display window on the host system. The display window as noted above may be a shared memory 2-dimensional array of characters. Information written to the display window by the test vehicle is presented to the test operator's display on the host system. This may be used for supporting the design and debug of the test vehicle or may be used in the actual test operation of the vehicle to inform the operator regarding progress of the test.

The reply message may provide the host system test application with identification information regarding the test vehicle such as a name or identifier of the test and version information regarding the identified test. In addition, fields of the reply message may request that the test application allocate an additional buffer in a shared memory for use by the test vehicle. Additional fields identify the initial values to be stored in such a buffer and identify the preferred word width for access to such an additional buffer. Subsequent messages discussed below exchange information about such an additional buffer.

HOST_MEMORY_BUFFER_POST_REQUEST

HOST_MEMORY_BUFFER_POST_REPLY

This Request Message supplies the test vehicle with the host system memory pointer of data that can be used by the test vehicle. The requested buffer is requested, as noted above, by a portion of the reply message associated with the test vehicle information request. The reply message to this post request message merely completes the message exchange to verify the allocation of the buffer. Such a buffer may then be used by the execution of the test vehicle for any purposes appropriate to that test vehicle.

TEST_START_REQUEST

TEST_START_REPLY

This Request message starts the test vehicle executing with the parameters sent in the parameter fields of the message. The parameter values are supplied by the test operator through user interaction as described further herein below. The test operator supplied values are then passed to the test vehicle as parameters to this start request message. The test vehicle reviews the parameters to determine if the parameters are proper. If the request parameters are proper for the test vehicle, the test will start and an appropriate general status so indicating the start of the test will be returned with the reply. The test will continue to run until a stop test message is sent or until the test vehicle finishes in its proper course. Upon sending this message and receiving a good status, the VMI host should then request and receive test status looking for the vehicle's test complete status bit to be set in the returned status field (as discussed above). This signifies that the test is done and ready to transmit detailed results from the execution of that test in response to a corresponding request message.

TEST_SENDREPLY_REQUEST

TEST_SENDREPLY_REPLY

As noted above, this request is intended to be sent only after the test has completed (as indicated by the test complete status in the current status reply message). This message exchange allows the vehicle to send back detailed information unique to the particular test completion status codes. Each test vehicle may be designed to provide its own detailed status of execution. The reply message here transmits whatever additional detailed status codes are programmed into the test vehicle as fields of the reply message.

Custom Command and Parameter Definition

The invention also includes a flexible command, status and parameter definition language that permits a test designer to define a wide variety of custom commands, test specific status and test parameters to be supplied by the test operator in starting a selected test vehicle. Parameters of test vehicles may be defined in the definition language. Status information unique to a particular test may also be defined by the language. In addition, entire custom commands may be defined by the language. The definitions includes types and ranges of permissible values as well as user interface information to prompt the test operator for desired values.

Parameter Definition

This flexible language is provided as a portion of the test vehicle and defines the user interface to be provided to the test operator to supply requisite parameters to start a test. The command language includes a number of keywords or directive to define the nature of each parameter to be supplied to the test vehicle on startup. Fields of the keywords to define a parameter also include text used to present readable options to the test operator to select desired values for the various parameters of the test vehicle.

The "parameter" keyword allows the test designer or operator to specify different parameters types and use them in the test or in custom tests (defined by the "command" keyword discussed below). Fields of the parameter keyword allow the parameter to be defined as a specific type such as a numeric value or a list of enumerated values for the user to chose from (i.e., a list of options). Additional fields of the parameter keyword provide default values for the parameter to assume if the operator does not specify a value for the parameter when prompted to do so. Still other fields allow a test designer to provide textual help messages to describe, for example, the usage of the parameter or permissible values for the parameter.

An exemplary syntax for specifying such custom parameters is provided below. Words in boldface represent keywords. Words in italics represent variable names that the user may choose. Words within "<",">" represent that the writer may choose one of those values.

```
PARAMETER PARAM1_NAME {
    TYPE=U32;
    DEFAULT=<default_value>;
    BOUNDARY_LOW=<lowest_value>;
    BOUNDARY_HIGH=<highest_value>;
    DESCRIPTION="Description of the parameter.";
}
PARAMETER PARAM1_NAME{
    TYPE=CUSTOM;
    CHOICES={Name_for_Choice 1, Name_for Choice2,
    Name_for_Choice3, ... };
    CHOICES_VALUE={val_for_Choice 1, val_for_Choice2,
    val_for_Choice3, ... };
    CHOICE_DESCRIPTION={
        "Description of Choice1",
        "Description of Choice2",
        "Description of Choice3",
        ... ,
    };
    DEFAULT=<default_choice_number>;
    DESCRIPTION="Description of the parameter.";
}
```

Current Status Definition

The VMI Host will send periodic request messages to elicit present status of the test vehicle. The vehicle will reply to these test status messages with standard status indicators preferably specified as bits in a bit field as discussed above. However, each test vehicle may also provide numerous other "standard" status values in response to a test application request message for current status. The particular status values unique to each test may be defined in the language of the present invention including user interface information for presentation of the unique status in an appropriate readable form.

The following is an example of a status definition syntax used in the definition language of the invention. As above, words in boldface represent keywords. Words in italics represent variable names that the user may choose. Words within "<",">" represent that the writer may choose one of those values.

```
CURRENT_STATUS CURRENT_STATUS_NAME {
    INDEX=< 1-31 >;
    UNITS="units";
    DESCRIPTION="Description of the current status.";
}
```

Reply Status Definition

The test vehicle may also return extended status as discussed above in reply to an appropriate request message from the test application. As above for the "standard" status definition, the language of the present invention allows the extended status information to be presented to a test operator in a readable format. The extended status reply message returns a selected status of a plurality of extended status indicators. Each possible status indicator is identified by a reply name entry of the definition language. Each names status indicator includes descriptive text to inform the test operator of the nature of the extended status indicator and a type entry to identify the type of values to be returned for the status indicator. The type entry, in turn includes descriptive text for each possible value of the named extended reply status indicator. An example of a reply definition follows: As above, words in boldface represent keywords. Words in italics represent variable names that the user may choose. Words within "<",">" represent that the writer may choose one of those values.

```
REPLY_STATUS REPLY_STATUS_NAME {
     REPLY_TYPE=<REPLY_STATUS_TYPE>
     DESCRIPTION="Description of reply status field."
}
REPLY_STATUS_TYPE REPLY_STATUS_TYPE0 {
     DESCRIPTION= {
"Status Good",
"Description of Error_1",
"Description of Error_2",
. . .
     };
}
```

Command/Custom Command Definition

The VMI Vehicle preferably also allows the test application and system under test to understand which parameters correspond to the main command (i.e., the test start request message) or for additional custom commands (optional). At least one command is preferably defined per vehicle in the definition language of the invention—namely the test start command transmitted as a test start request message. The command definition indicates the list of parameters to be supplied with the command by reference to the parameter definitions discussed above. The command directive for a defined command also includes the status information defined by the above status and reply directive. Additional commands may be defined for a particular test vehicle with associated parameters, status and replies (if any) as defined by appropriate directives discussed above. An example of a standard command definition (i.e., test start) and a custom command definition follows. As above, words in boldface represent keywords. Words in italics represent variable names that the user may choose. Words within "<",">" represent that the writer may choose one of those values.

```
COMMAND COMMAND_NAME0 {
     FUNCTION=VMI_FUNCTION_COMMAND;
PARAM_LIST= {
CMD_PARAM_NAME0,
CMD_PARAM_NAME1,
CMD_PARAM_NAME2,
. . .,
CMD_PARAM_NAME<MAX_COMMAND_PARAMETERS - 1>,
     };
REPLY_STATUS_LIST= {
REPLY_STATUS_NAME0,
REPLY_STATUS_NAME1,
REPLY_STATUS_NAME2,
. . .,
REPLY_STATUS_NAME<MAX_REPLY_STATUSES - 1>,
     };
CURRENT_STATUS_LIST= {
CURRENT_STATUS_NAME0,
CURRENT_STATUS_NAME1,
CURRENT_STATUS_NAME2,
. . .,
CURRENT_STATUS_NAME<MAX_CURRENT_STATUSES - 1>,
     };
     DESCRIPTION="Description of this command.";
}
```

Pseudo example of an additional custom command.

```
COMMAND COMMAND_NAME1 {
     FUNCTION=VMI_FUNCTION_CUSTOM_COMMAND1;
     PARAM_LIST={ CMD_PARAM_NAME1,
     CMD_PARAM_NAME2 };
     DESCRIPTION="Description of the command 1.";
}
PARAMETER CMD_PARAM_NAME0 {
     TYPE=U32
     DEFAULT=0x40
     DESCRIPTION="Description of the command parameter name0.";
}
PARAMETER CMD_PARAM_NAME1 {
     TYPE=U32;
     DEFAULT=<0-4G>;
     BOUNDARY_LOW=<0-4G>;
     BOUNDARY_HIGH=<0-4G>;
     DESCRIPTION="Description of the command parameter1."
}
PARAMETER CMD_PARAM_NAME2 {
     TYPE=CUSTOM;
     CHOICES={ Choice 1, Choice2, Choice3, . . . };
     CHOICE_DESCRIPTION={
"Description of Choice1",
"Description of Choice2",
"Description of Choice3",
. . .,
     };
     DEFAULT=<0 - Number_of_Choices>;
     DESCRIPTION="Description of the command parameter2.";
}
```

Vehicle Binary Image Definition

One further directive in the test vehicle defines the type of the vehicle file itself. The image type will be specified by vehicle type directive in the language of the present invention. If the type is "SHARED_RAM", the test vehicle configuration file will contain the binary image of the vehicle. The VMI Host will load this image into the IOC shared memory and start the execution of the firmware image. In the VMI configuration file, the firmware image will preferably start immediately after the directive string VMI_BINARY_IMAGE and will end at the end of the file. If the test vehicle type is ROM, then the host will assume the firmware image is written to the external flash and the firmware will begin executing after a hard reset.

Those of ordinary skill in the art will recognize that the definition language described above are intended merely as exemplary of a syntax and semantic for such a flexible definition language. Numerous equivalent language constructs may be used in implementing this broad feature of the present invention—namely that the test vehicle file includes configuration information in the form of directive written in a high level definition language.

Further, it will be noted that in the preferred embodiment, the configuration information in the form of definition language directives as above is preferably contained within the file that defines the test vehicle. The binary code image and configuration directives are preferably integrated within the same file structure. This provides the benefit of reducing the possibility that a test vehicle's executable code would be separated from the associated configuration information such that the test would be run with inappropriate configuration information.

FIG. 2 is a flowchart describing methods in accordance with the present invention for providing standard interaction between a host system, a system under test (i.e., IOC 102) and a test operator using the host system. Element 200 is first operable to transmit the desired tests of the vehicle to the IOC using the shared memory interface noted above for storing program instructions in the memory of the IOC. In a preferred embodiment, program memory associated with the IOC (system under test) is adapted to provide shared access to the IOC processors and to the host system. The host system may therefore simply write information into the program memory of the IOC to program a particular desired test sequence for execution by the IOC processors. As noted elsewhere herein, numerous other equivalent interfaces may be used for transmitting a desired test sequence to the system under test (IOC). Other communication media in addition to the above identified shared memory technique may be used for transmitting such program instructions to the IOC. In addition, the IOC may be preprogrammed with a number of existing standard test sequences to thereby obviate the need for downloading a desired tests sequence.

Element 202 then awaits indication from the IOC that it is ready to perform the loaded test sequence. Such an indication may preferably be generated as a status bit in a shared memory location including, for example, the mailbox used for other communications as described herein below. When the IOC indicates its readiness for proceeding with a test, element 204 next preferably transmits a vehicle information request. A vehicle information request message, as discussed above, may preferably provide information for the test vehicle to identify memory on the host system accessible to the IOC for purposes of displaying messages to a test operator using the host system. This memory location may preferably be accessed as shared memory within the host system accessible by the IOC. Element 206 then awaits receipt of the reply message from the IOC in response to the vehicle information request message. The reply may preferably indicate status of the test vehicle.

The vehicle information reply message may optionally indicate that additional buffer memory be allocated in a shared memory of the host system accessible to the IOC for purposes of operating the selected test vehicle. Element 208 determines whether the reply to the vehicle information request indicates that additional shared memory buffer space on the host system need be allocated for purposes of performing the selected test vehicle. If not, processing continues with element 214 as described further herein below. If such additional shared buffer space has been requested as indicated in the vehicle information reply message, element 210 is next operable to transmit a host buffer post request to the IOC providing information regarding the allocated buffer space in host system shared memory. Element 212 then awaits receipt of a reply to the host buffer post request message.

Element 214 is next operable to transmit a test start request message from the host system to the IOC indicating that the test vehicle should commence execution of the selected test. Element 216 then awaits receipt of a reply message to the test start request indicating that the test vehicle has begun execution of the selected test vehicle. In an exemplary preferred embodiment, the method of the present invention may then enter a polling sequence to determine when the selected test vehicle has completed the programmed test sequence. Element 218 therefore transmits a current status request message from the host system to the IOC requesting current status information regarding operation of the test vehicle within the IOC. Element 220 then awaits a response to the current status request providing current status information regarding operation of the present test vehicle within the IOC. Element 222 then determines whether the current status reply message indicates that the test has been completed. If not, processing continues by looping back to element 218 to transmit a next status request and await an associated status reply.

When element 222 determines that the present test vehicle has completed execution of the test sequence, element 224 is preferably operable to transmit a test information request message from the host system to the IOC. Element 226 then awaits a reply message from the IOC in response to the test information request. The reply message may preferably provide additional test result information indicative of detailed results of the particular completed test vehicle. Element 228 then presents the provided detailed completion status information received in the test information reply message to the operator. Presentation of such information may include, for example, display of the information for the test operator to review and/or logging of the information in a test log file for subsequent postprocessing.

As noted above, in a preferred exemplary embodiment, the IOC (system under test) is provided with a two-dimensional array of characters in shared memory of the host system such that the IOC may write test related messages in the two-dimensional array of characters in shared memory. An asynchronous process is preferably operable within the host system to monitor this shared two-dimensional array for any changes in the text and to present such changed information to the test operator on a display screen and/or in a log file. Element 300 is therefore operable to await a change in the test data presently stored in the shared two-dimensional array. When a change is detected by element 300, element 302 is then operable to display the current test data for presentation to the test operator on an operator display and/or log file. Element 304 is then operable to transmit any data updated by user input in the two-dimensional array to the IOC for processing thereof. Data changed by user input in the two-dimensional array is indicative of a user response to a test vehicle message and therefore needs to be communicated to the test vehicle for appropriate processing.

As presented herein above, methods of the present invention are preferably operable on the host system to poll the IOC for status information to determine when events of interest have occurred within the IOC executing the downloaded test vehicle. Alternatively, or in addition to such polling sequences, changes of state within the test vehicle operable on the IOC may generate asynchronous events and corresponding interrupts within the host system. Element 310 of FIG. 3 represents such processing of an asynchronously received event by the host system from the IOC. Such asynchronous processing of a received event may replace polling sequences described above for detecting, for example, completion of the execution of a test vehicle.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In an automated test environment having a system under test and a host system, a method for testing said system under test comprising the steps of:
   connecting the system under test directly to a host system;
   providing a mailbox interface within said system under test for exchange of information between said system under test and said host system;

providing a shared memory area on said system under test accessible to said host system through the direct connection between the system under test and the host system;

downloading from said host system to said system under test program instructions to be executed by said system under test wherein the program instructions define a test sequence, wherein the downloaded program instructions are stored into said shared memory area, and wherein the downloading step is performed in accordance with a protocol; and exchanging information between the host system and the system under test while executing the program instructions, the exchanges regarding processing of said test sequence using said mailbox interface in accordance with said protocol, wherein said protocol is independent of the particular said test sequence to be executed and independent of the particular said system under test.

2. The method of claim 1 wherein the step of providing said mailbox interface includes the step of:

providing said mailbox interface within said shared memory.

3. The method of claim 1 wherein the step of exchanging information includes the steps of:

exchanging operator interaction information between said system under test and said host system using said mailbox interface and using said shared memory area.

4. The method of claim 3 wherein said shared memory area is a two-dimensional array of characters and wherein the step of exchanging operator interaction information further comprises the steps of:

storing messages in said two-dimensional array of characters by operation of said system under test; and presenting said messages to a test operator by operation of said host system.

5. The method of claim 1 further comprising the step of:

downloading configuration information regarding said test sequence from said host system to said system under test.

6. The method of claim 5 wherein said program instructions and said configuration information comprise a single file.

7. The method of claim 1 wherein the step of exchanging information includes the step of:

exchanging test sequence control messages between said host system and said system under test to control operation of said test sequence within said system under test.

8. The method of claim 1 wherein the step of exchanging information includes the step of:

exchanging test sequence status messages between said host system and said system under test to report the status of operation of said test sequence within said system under test.

* * * * *